US010054710B2

(12) United States Patent
Chen et al.

(10) Patent No.: US 10,054,710 B2
(45) Date of Patent: Aug. 21, 2018

(54) SIMULATING OPTICAL SENSOR RESPONSE DATA FOR FLUIDS IN A WELLBORE

(71) Applicant: Halliburton Energy Services, Inc., Houston, TX (US)

(72) Inventors: Dingding Chen, Tomball, TX (US); Bin Dai, Spring, TX (US); David L. Perkins, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 167 days.

(21) Appl. No.: 15/035,125

(22) PCT Filed: Dec. 4, 2014

(86) PCT No.: PCT/US2014/068559
§ 371 (c)(1),
(2) Date: May 6, 2016

(87) PCT Pub. No.: WO2016/089406
PCT Pub. Date: Jun. 9, 2016

(65) Prior Publication Data
US 2016/0349400 A1    Dec. 1, 2016

(51) Int. Cl.
*G01V 8/02*    (2006.01)
(52) U.S. Cl.
CPC ..................................... *G01V 8/02* (2013.01)
(58) Field of Classification Search
CPC .......... G01V 8/02; G01V 11/00; E21B 47/002
See application file for complete search history.

(56) References Cited

U.S. PATENT DOCUMENTS

| 4,994,671 A | 2/1991 | Safinya et al. |
| 9,702,248 B2 * | 7/2017 | Chen ................... E21B 49/08 |

(Continued)

FOREIGN PATENT DOCUMENTS

| WO | 2013/089764 A1 | 6/2013 |
| WO | 2014/137354 A1 | 9/2014 |

OTHER PUBLICATIONS

Indo, Kentaro, Kai Hsu, and Julian John Pop. "Estimation of Fluid Composition From Downhole Optical Spectrometry,"SPE Paper 166464, SPE Journal (2015).

(Continued)

*Primary Examiner* — Bryan Bui
(74) *Attorney, Agent, or Firm* — Benjamin Fite; Baker Botts L.L.P.

(57) ABSTRACT

Systems and methods for simulating optical sensor response data for fluids in a wellbore are disclosed herein. A system comprises a downhole tool, an optical sensor coupled to the downhole tool, and a sensor information mapping module. The sensor information mapping module is operable to receive sensor response information associated with the optical sensor and a first fluid, receive sensor spectra information associated with the optical sensor, and receive fluid spectroscopy information associated with the first fluid. The sensor information mapping module is also operable to determine a transformation matrix using the sensor response information, the sensor spectra information, and the fluid spectroscopy information, and determine, using the transformation matrix, simulated sensor response information associated with the optical sensor and a second fluid.

21 Claims, 7 Drawing Sheets

(56) References Cited

U.S. PATENT DOCUMENTS

| 9,733,383 B2* | 8/2017 | Freed ........................ G01V 3/32 |
| 2004/0069942 A1 | 4/2004 | Fujisawa et al. |
| 2008/0030729 A1 | 2/2008 | Difoggio |
| 2013/0085674 A1 | 4/2013 | Zhdaneev et al. |
| 2014/0096955 A1 | 4/2014 | Indo et al. |

OTHER PUBLICATIONS

International Search Report and Written Opinion issued in related PCT Application No. PCT/US2014/068559 dated Aug. 13, 2015, 16 pages.

International Preliminary Report on Patentability issued in related Application No. PCT/US2014/068559, dated Jun. 15, 2017 (13 pages).

* cited by examiner

SIMULATING OPTICAL SENSOR RESPONSE DATA FOR FLUIDS IN A WELLBORE

CROSS-REFERENCE TO RELATED APPLICATIONS

This application is a U.S. National Stage Application of International Application No. PCT/US2014/068559 filed Dec. 4, 2014, which is incorporated herein by reference in its entirety for all purposes.

BACKGROUND

This disclosure generally relates to characterizing of fluids present in hydrocarbon wellbores. In particular, this disclosure relates to systems and methods for measuring and simulating optical sensor response data associated with fluids in a wellbore.

When performing subterranean operations in wellbores, it is often desirable to obtain information about the subterranean formation, including information regarding the fluids present in the formation. During sampling and testing the formation, for instance, formation fluid may be drawn from the formation and passed by a downhole optical tool (e.g., an optical sensor incorporated on a wireline formation tester). The downhole optical tool may be designed with a number of optical channels to measure optical responses from the fluid as a function of the wavelength of the light. The data from these optical channels can then be processed as inputs to fluid characterization models for estimation of fluid properties such as fluid composition, density, or viscosity.

The fluid characterization models are usually pre-determined from a database of laboratory-measured spectral data at various temperatures and pressures transformed to estimate fluid compositions and other properties. To apply the measured optical tool data to the fluid models directly, the fluid models may need to be calibrated in actual sensor parameter spaces, requiring optical feature mapping from the database to the corresponding sensor database through a transformation algorithm before developing the fluid characterization models. The data transformation, however, may be difficult to achieve depending on the difference between the synthetic sensor and actual sensor responses, the number and the type of reference fluids used for modelling transformation algorithm, the features selected as attributable input and output of mapping function, and the robustness of the transformation in dealing with interpolated and extrapolated optical fluid responses.

BRIEF DESCRIPTION OF THE DRAWINGS

These drawings illustrate certain aspects of certain embodiments of the present disclosure. They should not be used to limit or define the disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Figure 1:
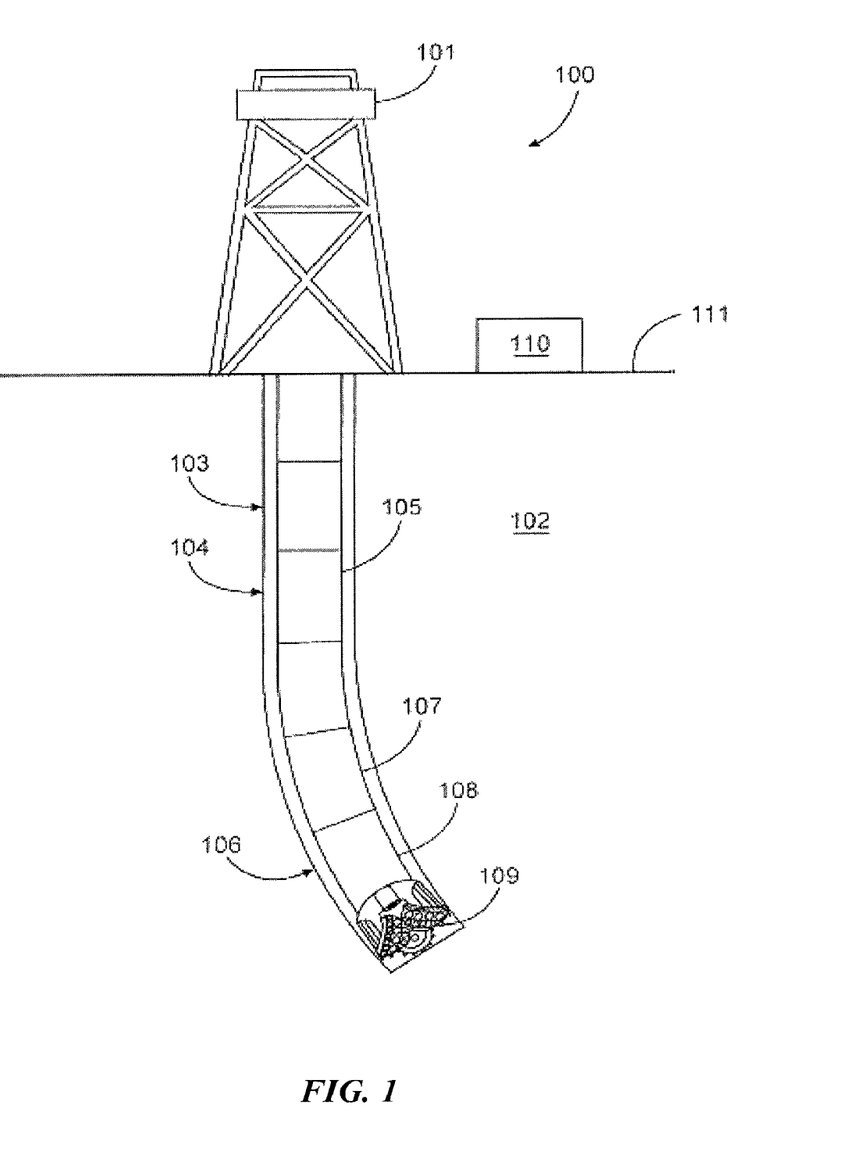
FIG. 1 illustrates an example drilling system 100 in accordance with embodiments of the present disclosure.
Figure 2:
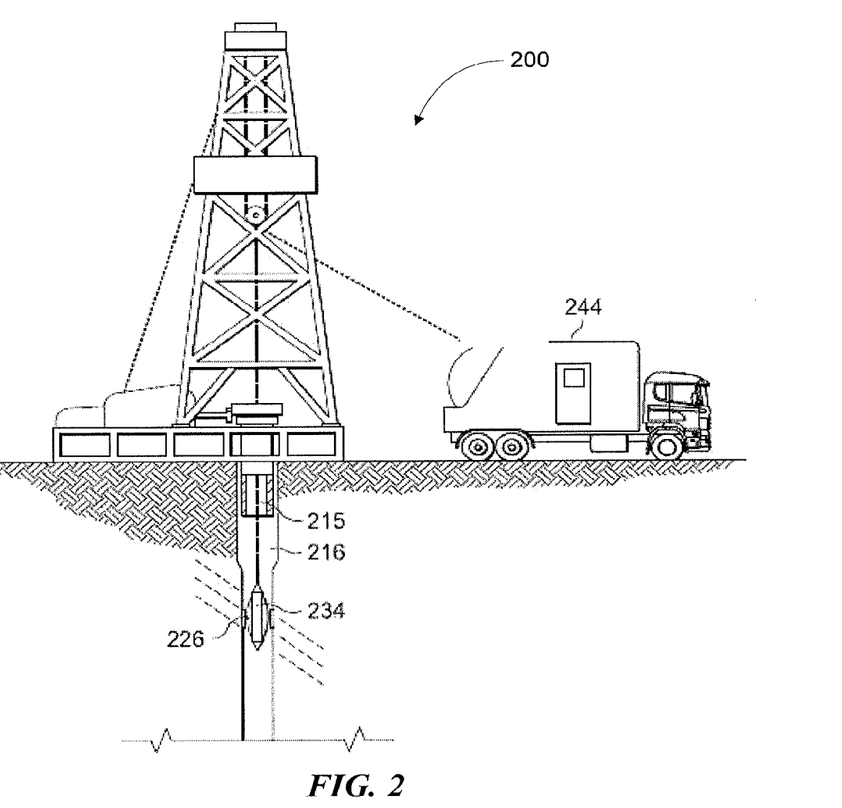
FIG. 2 illustrates an example downhole system with the drill string removed in accordance with embodiments of the present disclosure.

The present disclosure describes systems and methods for measuring and simulating optical sensor response data associated with fluids in a wellbore. The optical sensors may be incorporated into a downhole optical tool located on a drill string, as shown in FIG. 1, or on a wireline, as shown in FIG. 2. The downhole optical tool may be any suitable tool for sampling, testing, or otherwise obtaining information about fluids present in the formation. Data from optical sensors incorporated on the downhole optical tool may be processed as inputs to fluid characterization models for estimation of fluid properties in particular embodiments. The fluid characterization models used may be pre-determined from a database of laboratory-measured spectral data for reference fluids at various temperatures and pressures, and the laboratory-measured spectral data may be transformed to represent simulated sensor responses. Thus, in order to apply the measured optical tool data to the fluid models directly, the fluid models may need to be calibrated in actual sensor parameter spaces (i.e., with reference to the actual measured optical tool data rather than with reference to the simulated optical tool data in the database), which may require a mapping between the synthetic optical tool responses in the database and corresponding actual sensor responses through a transformation algorithm prior to developing the fluid characterization models.

Current systems and methods for mapping actual sensor response data to synthetic sensor response data may convert actual sensor signal responses from an optical tool to synthetic response data through linear or non-linear transformation techniques. In conventional approaches, the fluid characterization models may need to be calibrated with synthetic sensor response data rather than actual sensor response data. One limitation of synthetic sensor response data-based calibration is its difficulty in integrating real optical sensor measurements on new fluids (e.g., those in a formation) into an existing database of laboratory-measured spectral data due to inconsistencies associated with the approximation of the synthetic sensor responses. In addition, using a standard linear transformation algorithm, such as direct piecewise standardization applied to each optical channel, may not be able to address the nonlinearity between the synthetic sensor response data and the actual sensor response data. Further, the issue of information loss may arise when synthetic sensor response is calculated from a dot product of fluid spectra and simulated sensor wheel element spectrum, which may not be unique compared to a target output of the transformation algorithm. The mapping accuracy of such an approach may be unacceptable when using the selected reference fluids as data used for model development. On the other hand, neural networks using non-linear transformations may generally be suitable for mapping data from the actual sensor space to synthetic sensor space. However, such transformations may be sensitive to reference fluid selection and may suffer from over-fitting and performance failure using extrapolated data as inputs.

Accordingly, aspects of the present disclosure may convert spectral data used for determining synthetic sensor responses to equivalent optical sensor response data in tool parameter space by using a linear transformation algorithm. Fluid spectrometry information and sensor spectra information convolved over the measurement system components (e.g., the optical sensor channels) may be used as transformation inputs. Fluid spectrometry information may refer to measurements of the characteristics of light as it transits through, emits from, or reflects from fluids (e.g., wavelength-dependent intensity), while sensor spectra information may refer to the signal intensity of a given optical channel through the entire optical path of the system versus wavelength in response to stimulated light (e.g., in transmittance or reflectance modes, or any combination thereof). The equivalent optical sensor response data on a variety of characterized petroleum fluids may then be the transformation output, and may consist of optical sensor output information observed at each optical channel in tool parameter space with reduced dimensionality. The output of each channel may thus represent cumulated signal intensity over a particular narrow band optical filter or a wide band integrated computational element. The conversion from transformation inputs to outputs may be determined through a transformation matrix that is pre-determined using a number of reference fluids, wherein both transformation inputs and outputs can be pre-determined or measured in lab analysis as known training data sets.

Using aspects of the present disclosure, quality mapping can be achieved as influential factors of fluid spectrometry information and sensor spectra information on optical tool responses are dealt with independently. In particular, an application of singular value decomposition (SVD) may be used for optical data transformation analysis, such as to calculate pseudo inversion of fluid spectrometry data and sensor spectra of reference fluids in determining a robust transformation matrix. As such, the transformation on the new data can be well controlled by adjusting tolerance parameters of pseudo inversion function to prevent the data mapping from overfitting. Because transformation data processing may be performed off-line, refinement of transformation matrix with use of tolerance parameter can be iteratively tuned multiple times through validation testing on the new data to achieve quality mapping of the sensor information.

After such a transformation matrix is determined from the reference fluids, it may be used to simulate the unknown optical sensor response data for other fluids with given transformation inputs. The transformed optical sensor responses can then be constructed as part of new calibration data sets and used in conjunction with other information from quantitative fluid analysis to develop various predictive models in estimating formation fluid composition and other properties. In application, tool measurements can be processed with fluid models trained on the sensor parameter space directly without extra transformation. The real-time data processing software can then be simplified by removing instrument standardization from the current software framework.

To facilitate a better understanding of the present disclosure, the following examples of certain embodiments are given. In no way should the following examples be read to limit, or define, the scope of the disclosure. Embodiments of the present disclosure and its advantages are best understood by referring to FIGS. 1 through 5, where like numbers are used to indicate like and corresponding parts.

FIG. 1 illustrates an example drilling system 100 in accordance with aspects of the present disclosure. The drilling system 100 includes a rig 101 located at a surface 111 and positioned above a wellbore 103 within a subterranean formation 102. In certain embodiments, a drilling assembly 104 may be coupled to the rig 101 using a drill string 105. In other embodiments, the drilling assembly 104 may be coupled to the rig 101 using a wireline or a slickline, for example. The drilling assembly 104 may include a bottom hole assembly (BHA) 106. The BHA 106 may include a drill bit 109, a steering assembly 108, and a LWD/MWD apparatus 107. A control unit 110 located at the surface 111 may include a processor and memory device, and may communicate with elements of the BHA 106 (e.g., optical tools in the LWD/MWD apparatus 107 and/or the steering assembly 108). The control unit 110 may receive data from and send control signals to the BHA 106 or components thereof. Additionally, in some embodiments, at least one processor and memory device may be located downhole within the BHA 106 for the same, purposes. The LWD/MWD apparatus 107 may log the formation 102 (i.e., sample, test, and/or otherwise obtain information about the formation) both while the wellbore 103 is being drilled, and after the wellbore is drilled to provide information regarding ongoing subterranean operations.

FIG. 2 illustrates an example downhole system 200 with the drill string removed in accordance with embodiments of the present disclosure. At various times after the drilling is completed, drill string 105 may be removed from wellbore 103 and a downhole optical tool may be used to log information (i.e., sample, test, and/or otherwise obtain information) about fluids in the subterranean formation. Subterranean operations such as logging may be conducted using wireline system 234 once the drill string has been completely removed. Wireline system 234 may include one or more optical tools 226 attached to a tool string that may be suspended into wellbore 216 by conveyance 215 (e.g., a cable, slickline, coiled tubing, or the like). The tool string may comprise multiple reservoir description modules, including one or more optical tools 226 and/or other logging tools. Optical tool 226 may comprise one or more optical sensors installed with one or more optical channels. Optical tool 226 may be communicatively coupled to conveyance 215. Conveyance 215 may contain conductors for transporting power to wireline system 234 and telemetry from optical tool 226 to logging facility 244. Alternatively, conveyance 215 may lack a conductor, as is often the case using slickline or coiled tubing, and wireline system 234 may contain a control unit similar to control unit 110, shown in FIG. 1, that contains memory, one or more batteries, and/or one or more processors for performing operations and storing measurements. Logging facility 244 (shown in FIG. 2 as a truck, although it may be any other structure) may collect measurements from optical tool 226, and may include computing facilities for controlling, processing, or storing the measurements gathered by optical tool 226. The computing facilities may be communicatively coupled to optical tool 226 by way of conveyance 215 and may operate similarly to control unit 110 as shown in FIG. 1. An example computing facility is described with more detail with reference to FIG. 3.

Figure 3:
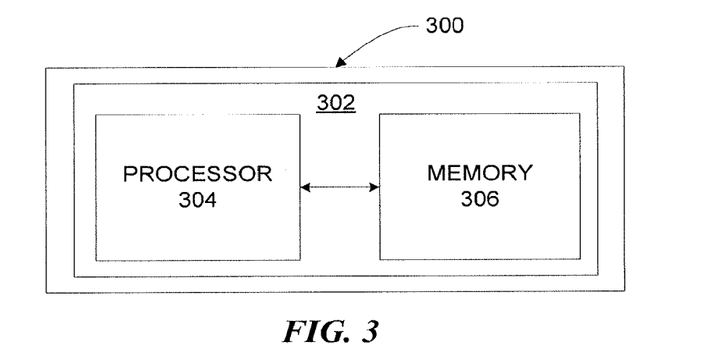
FIG. 3 illustrates a block diagram of an example computer system 300 coupled to an optical tool in accordance with embodiments of the present disclosure.

FIG. 3 illustrates a block diagram of an example computer system 300 coupled to an optical tool in accordance with embodiments of the present disclosure. Computer system 300 may be configured to map synthetic optical sensor information to actual optical sensor data by determining a transformation matrix in particular embodiments. Computer system may be used to perform the steps of method 600 as described below with respect to FIG. 6. Computer system 300 or components thereof can be located at the surface, downhole (e.g., in the BHA and/or in the logging tool), or some combination of both locations (e.g., certain components could be disposed at the surface and certain components could be disposed downhole, where the surface components are communicatively coupled to the downhole components). Computer system 300 may include sensor information mapping module 302 in some embodiments. Sensor information mapping module 302 may include any suitable components. For example, in some embodiments, sensor information mapping module 302 may include processor 304. Processor 304 may include, for example a microprocessor, microcontroller, digital signal processor (DSP), application specific integrated circuit (ASIC), or any other digital or analog circuitry configured to interpret and/or execute program instructions and/or process data. In some embodiments, processor 304 may be communicatively coupled to memory 306. Processor 304 may be configured to interpret and/or execute program instructions and/or data stored in memory 306. Program instructions or data may constitute portions of software for carrying out control of the vibrations of a wellbore logging tool, as described herein. Memory 306 may include any system, device, or apparatus configured to hold and/or house one or more memory modules; for example, memory 306 may include read-only memory, random access memory, solid state memory, or disk-based memory. Each memory module may include any system, device or apparatus configured to retain program instructions and/or data for a period of time (e.g., computer-readable non-transitory media). In particular embodiments, sensor information mapping module 302 may be further configured to cause processor 304 to execute program instructions operable to determine a transformation matrix for mapping synthetic sensor response information to actual sensor response data.

Modifications, additions, or omissions may be made to FIG. 3 without departing from the scope of the present disclosure. For example, FIG. 3 shows a particular configuration of components of computer system 300. However, any suitable configurations of components may be used. For example, components of computer system 300 may be implemented either as physical or logical components. Furthermore, in some embodiments, functionality associated with components of computer system 300 may be implemented in special purpose circuits or components. In other embodiments, functionality associated with components of computer system 300 may be implemented in configurable general purpose circuit or components. For example, components of computer system 300 may be implemented by configured computer program instructions.

In particular embodiments, computer system 300 or components thereof may use Equation (1) below to perform an optical data transformation from the synthetic sensor parameter space to the tool parameter space. In Equation (1), DOS may represent the normalized detector output of sensor in tool parameter space. The right side of equation specifies the transformation inputs in synthetic sensor parameter space and transformation matrix. SpecPVT may represent the normalized fluid spectroscopy data determined from a standard database of laboratory-measured data, TrsMx may represent a transformation matrix to be determined, and SpecFilt may represent measured or simulated sensor spectra data convolved over the optical system components (e.g., the channels of the optical sensor). The DOS, SpecPVT, SpecFilt, and TrsMx matrices may be of any suitable dimensions. In certain embodiments, the TrsMx matrix may be a square matrix.

$$DOS = SpecPVT \times TrsMx \times SpecFilt \quad (1)$$

It will be understood that, in the synthetic sensor parameter space, the multiplication of the fluid spectroscopy data with the sensor spectra data results in the normalized synthetic sensor response on fluids, which may be different from the actual sensor output. Accordingly, a transformation matrix TrsMx may be used as shown in Equation (1) to compensate for the difference between the synthetic sensor response data (i.e., SpecPVT×SpecFilt) and the actual sensor response data (i.e., DOS) such that actual sensor responses may be determined or simulated from fluid spectroscopy data and sensor spectra data. More particularly, using Equation (1), transformation matrix TrsMx may be derived from the known transformation inputs and outputs based on the selected reference fluids. In some embodiments, for instance, singular value decomposition (SVD) inversion techniques may be applied to elements of Equation (1) to determine the transformation matrix TrsMx. Such inversion techniques may include the pseudo inversion of the fluid spectrometry (SpecPVT) and sensor spectra (SpecFilt) matrices. The transformation matrix can then be determined as shown Equation (2), where PINV represents the pseudo inverse function implemented with SVD, such as may be used in commercial software products (e.g., MATLAB from The MathWorks Inc., LABVIEW from National Instruments, or MATHCAD). In some embodiments, an adjustable parameter with function PINV may be used to allow for control of matrix mapping errors and thus prevent overfitting issues with transformation matrix $TrsMx_T$.

$$TrsMx_T = PINV(SpecPVT_T) \times DOS_T \times PINV(SpecFilt_T) \quad (2)$$

From Equation (2), the transformation matrix TrsMx may be derived for particular temperature points. More particularly, the transformation matrix $TrsMx_T$ is determined from the reference fluids using SpecPVT, DOS, and SpecFilt data for a particular temperature, T. Accordingly, the determined transformation matrix may be useful around that single temperature. Other transformation matrices may be determined for different temperatures using SpecPVT, DOS, and SpecFilt data at desired temperatures. In particular embodiments, the fluid spectroscopy data, sensor spectra data and sensor response data for the reference fluids may be measured under the same pressure, volume, and temperature conditions. However, other embodiments may determine a transformation matrix even if the sensor spectra data are collected under different temperature and pressure conditions. The effect of pressure differences is less significant than temperature to sensor spectra data, and can therefore be compensated through using matched data pairs of fluid spectroscopies and sensor responses. To compensate practical signal variation in deriving the transformation matrix TrsMx, two-dimensional interpolation may be applied in some embodiments to create matched fluid spectroscopies based on measured temperature and pressure conditions present in collecting the sensor responses for the reference fluids during calibration.

Once the transformation matrix TrsMx is determined, it may be used to simulated sensor response data for other fluids at particular temperatures T. The simulated response data may be determined according to Equation (1) above, in particular embodiments, using the determined $TrsMx_T$ from Equation (2) along with the spectra data already known (i.e., SpecFilt) and fluid spectrometry information (i.e., SpecPVT) for the fluid to be simulated.

Figure 4A:
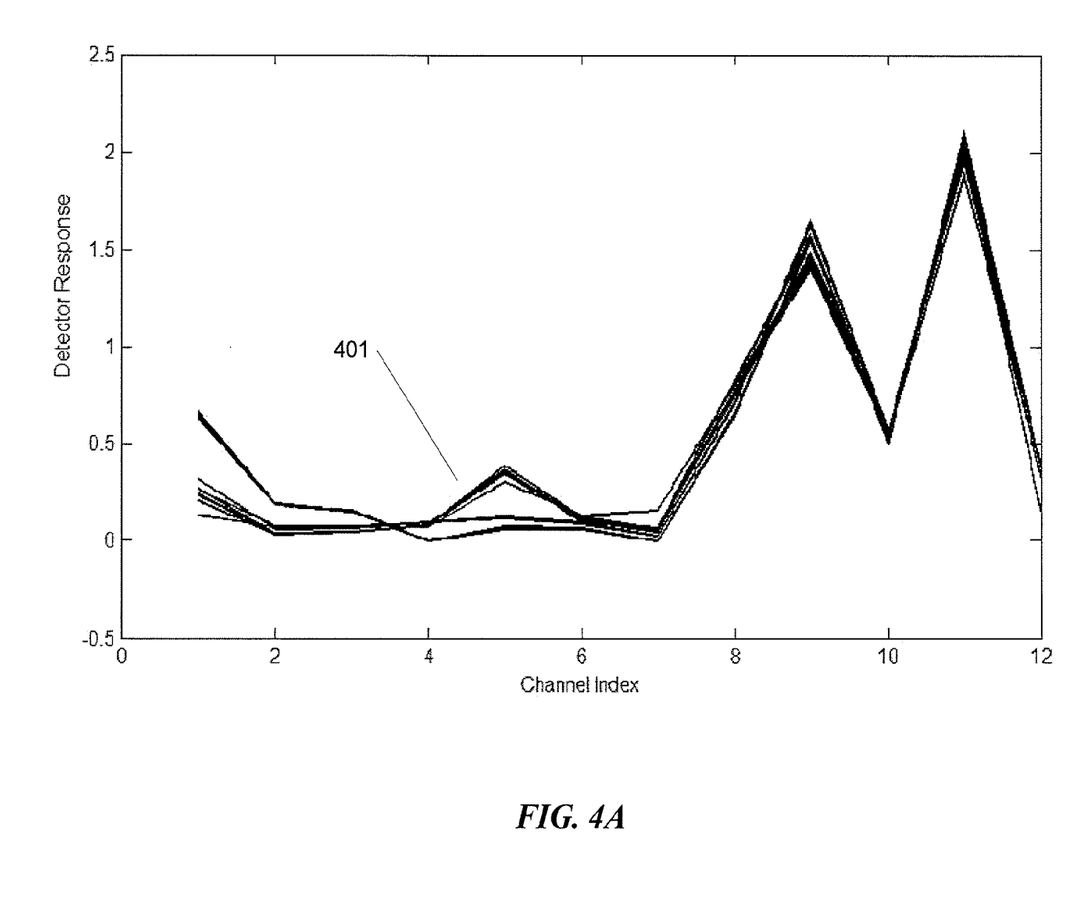
FIG. 4A illustrates example sensor response data for typical reference fluids over twelve sensor channels in accordance with embodiments of the present disclosure.

FIG. 4A illustrates example sensor response data 401 (i.e., DOS in Equations (1) and (2)) for typical reference fluids over twelve sensor channels in accordance with embodiments of the present disclosure. The sensor response data may be normalized in particular embodiments, and may be pre-processed with baseline correction and/or neutral density normalization. Neutral density (ND) filters refer to particular elements installed on an optical sensor to equally attenuate the intensity of a light beam over a wide wavelength range. To improve signal to noise ratios, or signal drift characteristics, of an optical sensor, the signal intensity of a blocked optical channel is often used as referential baseline and subtracted from the measured raw signal of each optical channel for baseline correction. The baseline corrected signals are then divided by the corresponding ND signals as normalized optical sensor responses for further processing analysis. The optical sensor may be configured with suitable number of channels comprising any suitable optical filters, and/or computational elements. For example, in particular embodiments, the sensors may comprise narrow band pass filters, integrated computational elements, or other optical elements designed to allow measurement of the fluid spectra as a function of wavelength or optically process the sample spectral information, or both.

Figure 4B:
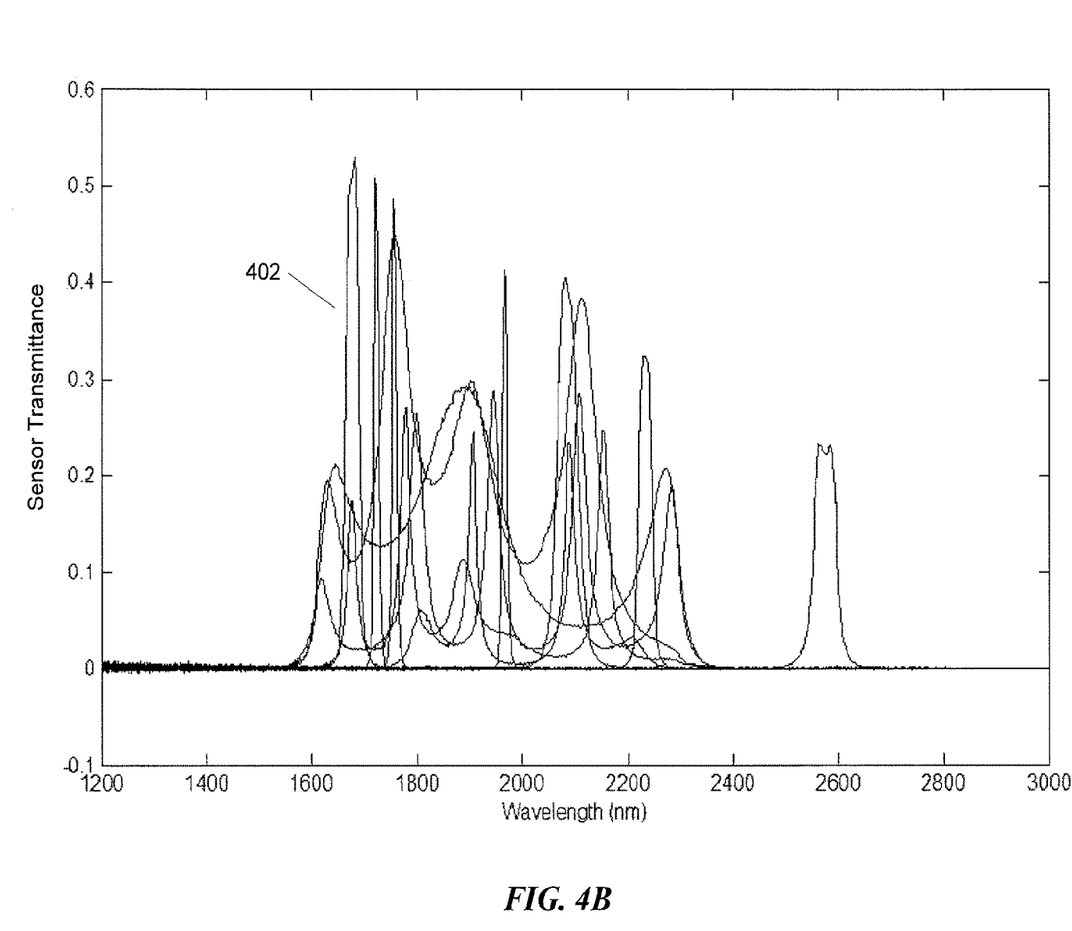
FIG. 4B illustrates example sensor spectra data for twelve sensor channels in accordance with embodiments of the present disclosure.

FIG. 4B illustrates example sensor spectra data 402 (i.e., SpecFilt in Equations (1) and (2)) for twelve sensor channels in accordance with embodiments of the present disclosure. The spectra data may be transmittance or reflectance spectra data, or combinations thereof. The spectra data may, in some embodiments, be convolved over all the components of the optical tool, such as a light source, a fluid cell/window, calcium fluoride (CaF2), and a detector. In certain embodiments, the spectra may be measured and/or simulated under the same temperature specified for calibration (i.e., that used during the measurement of the fluid spectroscopy data). However, in other embodiments, the spectra may be measured and/or simulated under some other condition (e.g., room temperature and pressure) as the temperature inconsistence with respect to the fluid spectroscopy data can be compensated for through the determined transformation matrix TrsMx.

Figure 4C:
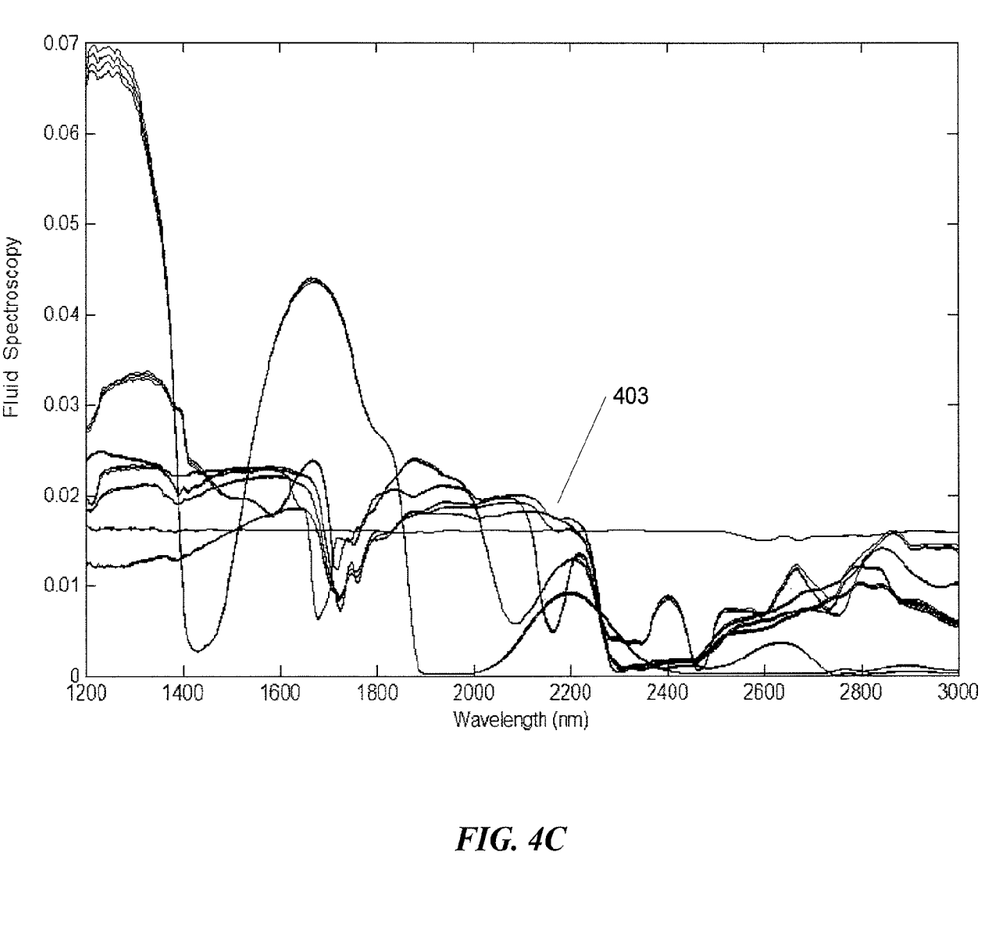
FIG. 4C illustrates example fluid spectroscopy data for typical reference fluids in accordance with embodiments of the present disclosure.

FIG. 4C illustrates example fluid spectroscopy data 403 (i.e., SpecPVT in Equations (1) and (2)) for typical reference fluids in accordance with embodiments of the present disclosure. In particular embodiments, the fluid spectroscopy data may be selected first from laboratory-measured standard absorbance fluid spectrometry data in a database, and may then be converted to transmittance spectroscopies and normalized with neutral density filter responses as used in calculating synthetic sensor responses of selected fluids. To account for any slight variations in the temperature and/or pressure conditions during data collection, two-dimensional interpolation may be applied to the data in some embodiments to obtain matched spectroscopies using the temperatures and pressures of each measurement as interpolation inputs.

Figure 5:
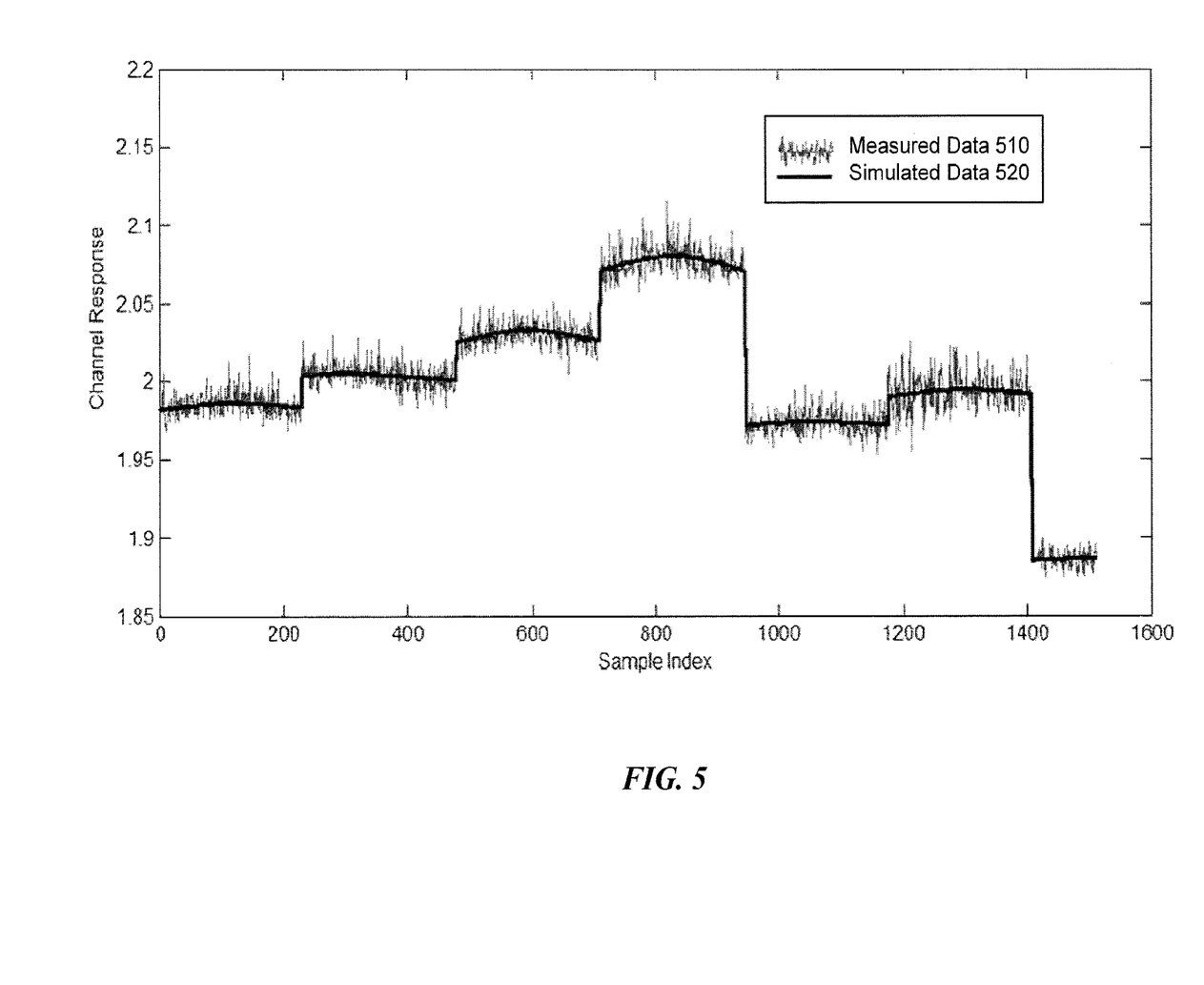
FIG. 5 illustrates example optical sensor measurements compared with example simulated optical sensor response data determined in accordance with embodiments of the present disclosure.

FIG. 5 illustrates measured optical sensor response data 510 compared with simulated optical sensor response data 520 on typical reference fluids determined in accordance with embodiments of the present disclosure. As seen in FIG. 5, the simulated sensor data 520 may closely predict the optical sensor measurements 510 a priori. In addition, it will be seen from FIG. 5 that the present disclosure is well suited to predict optical sensor data with suppression of noise that may appear on sensor measurements 510. Accordingly, the present disclosure may provide simulated sensor response data 520 that is smoother and more transparent to pressure-induced signal changes than sensor measurements 510.

Figure 6:
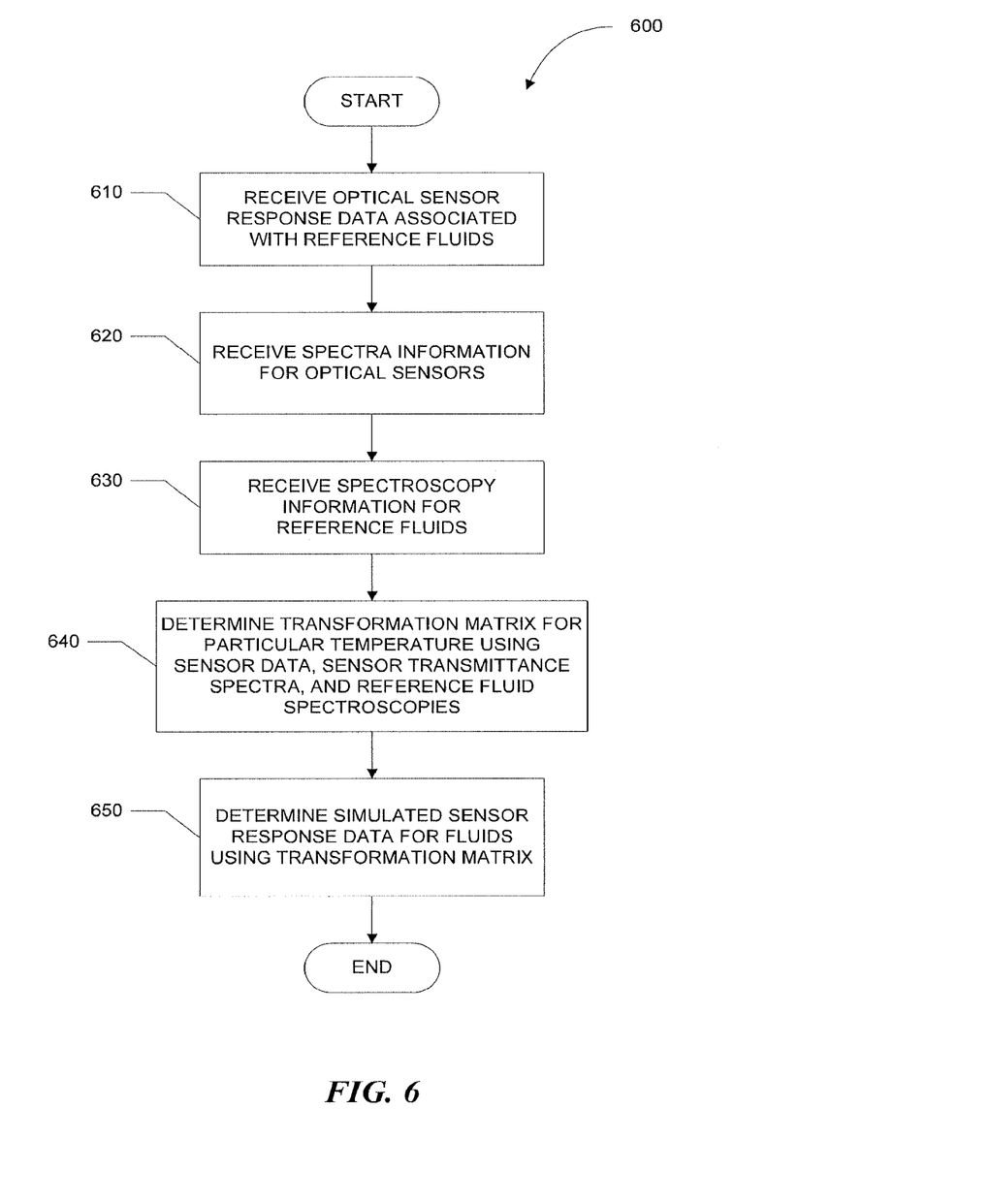
FIG. 6 illustrates an example method for simulating sensor response data for formation fluids in accordance with embodiments of the present disclosure.

FIG. 6 illustrates an example method 600 for simulating sensor response data for formation fluids in accordance with particular embodiments of the present disclosure. In some embodiments, the method may simulate sensor response data using sensor data associated with particular reference fluids, spectra data for the sensors, and spectroscopies for the reference fluids. The method begins at step 610, where sensor response data associated with particular reference fluids is received. The sensor response data for the reference fluids may have been pre-recorded in particular embodiments, and may have been stored in a database (and thus, may be received at step 610 from the database). The reference fluids may be any suitable fluid that may be used for representatively characterizing optical sensor responses of downhole fluids Example reference fluids may include water, dead oil, live oil, gas (methane or nitrogen for example), and other reference fluids having typical chemical compositions associated with petroleum fluids (toluene for aromatics, pentanediol and dodecane for saturates for example), or any combination of such fluids with each other or with other fluids. Data associated with any suitable number of reference fluids may be used for deriving robust transformation matrix. For example, data associated with typical reference fluids including, for example, water, dead oil, live oil and relevant hydrocarbon gas may be needed to adequately cover the dynamic range of the optical sensor responses of fluids in formation and wellbore. In particular embodiments, the sensor response data on reference fluids may be collected as same as the data used for manufacturing calibration. The sensor response data may include, in certain embodiments, sensor detector responses for each reference fluid at different temperatures and/or pressures. For example, the sensor response data may be collected for the reference fluids at temperatures of 150, 200, and 250 degrees Fahrenheit and at pressures of 3000, 6000, 9000, and 12,000 pounds per square inch. In some embodiments, the sensor response data may be normalized, as shown in FIG. 4A, using baseline correction and neutral density normalization.

At step 620, spectra data is received for the sensors to be incorporated on the downhole tool. The spectra data received at step 620 may be received from a database of sensor spectra information in certain embodiments, and may include spectra data collected through spectral analysis of the sensors incorporated in the downhole tool. The spectra data may include transmittance spectra data, reflectance spectra data, or any suitable combination thereof. In particular embodiments, the spectra data may be collected at the same temperature or temperatures at which the sensor response data for the reference fluids was collected. This may assist in creating more accurate mapping of sensor responses for other fluids using method 600. In other embodiments, however, the spectra data may be collected at a different temperature from that at which the sensor response data for the reference fluids was collected. Such temperature variations may be compensated for with the transformation matrix determined in step 640. The spectra data may be convolved over the optical components of measurement system in some embodiments, as shown in FIG. 4B.

At step 630, spectroscopy data for the reference fluids of step 610 are received. The spectroscopy data received at step 630 may be received from a database of fluid spectroscopy information in certain embodiments, and may include fluid spectroscopy data collected through spectral analysis of reference fluids. In particular embodiments, the spectroscopy data may be determined from converting stored absorbance fluid spectroscopies to transmittance spectroscopies, and then normalizing them using a neutral density filter. The spectroscopy data may be collected under the same temperature and pressure conditions as those under which the sensor data for the reference fluids was collected, in particular embodiments. In other embodiments, with spectroscopy data collected under different temperature and pressure conditions, two-dimensional interpolation techniques may be applied to obtain spectroscopy data at the same temperature and pressure levels under which the sensor response data was collected.

At step 640, a transformation matrix is determined using the sensor response data from step 610, the spectra data for the sensors from step 620, and the spectroscopy data from step 630. In particular embodiments, this may be determined using the pseudo inversion with singular value decomposition represented in Equation (2) above, using the data for each of the equation inputs collected at the same temperature. Accordingly, the determined transformation matrix may be temperature dependent in certain embodiments.

At step 650, simulated sensor response data is determined for certain fluids using the determined transformation matrix. In particular embodiments, the simulated sensor response data may be determined according to Equation (1) above using the determined transformation matrix from step 640, the spectra data for the sensors from step 620, and the fluid spectroscopy data for the fluid to be analyzed. The fluid spectroscopy data for the fluid to be analyzed may be collected in the same manner as described above with respect to step 630. The simulated sensor response data can be generated with each temperature dependent transformation matrix respectively and used as complete calibration data inputs in tool parameter space for fluid characterization model development.

Modifications, additions, or omissions may be made to method 600 without departing from the scope of the present disclosure. For example, the order of the steps may be performed in a different manner than that described and some steps may be performed at the same time. Additionally, each individual step may include additional steps without departing from the scope of the present disclosure.

To provide illustrations of one or more embodiments of the present disclosure, the following examples are provided. In one embodiment, a system comprises a downhole tool, an optical sensor coupled to the downhole tool, and a sensor information mapping module. The sensor information mapping module is operable to receive sensor response information associated with the optical sensor and a first fluid, receive sensor spectra information associated with the optical sensor, and receive fluid spectroscopy information associated with the first fluid. The sensor information mapping module is also operable to determine a transformation matrix using the sensor response information, the sensor spectra information, and the fluid spectroscopy information, and determine, using the transformation matrix, simulated sensor response information associated with the optical sensor and a second fluid.

In one or more aspects of the disclosed system, the sensor information mapping module is further operable to determine simulated sensor response information associated with the second fluid using fluid spectroscopy information associated with the second fluid.

In one or more aspects of the disclosed system, the sensor information mapping module is further operable to determine the transformation matrix using singular value decomposition.

In one or more aspects of the disclosed system, the sensor response information comprises information associated with a first temperature and the fluid spectroscopy information comprises information associated with the first temperature.

In one or more aspects of the disclosed system, the sensor spectra information comprises spectra information associated with a second temperature and the sensor information mapping module is operable to cause the processor to determine sensor spectra information associated with the first temperature using interpolation.

In one or more aspects of the disclosed system, the sensor response information comprises information associated with a first plurality of pressures and the fluid spectroscopy information comprises information associated with the first plurality of pressures.

In one or more aspects of the disclosed system, the sensor information mapping module is further operable to normalize the sensor response information using neutral density normalization.

In another embodiment, a method comprises receiving sensor response information associated with an optical sensor of a downhole drilling tool and a first fluid, receiving sensor spectra information associated with the optical sensor, and receiving fluid spectroscopy information associated with the first fluid. The method also comprises determining a transformation matrix using the sensor response information, the sensor spectra information, and the fluid spectroscopy information, and determining, using the transformation matrix, simulated sensor response information associated with the optical sensor and a second fluid.

In one or more aspects of the disclosed method, the method further comprises determining simulated sensor response information associated with the second fluid using fluid spectroscopy information associated with the second fluid.

In one or more aspects of the disclosed method, the method further comprises determining the transformation matrix using singular value decomposition.

In one or more aspects of the disclosed method, the sensor response information comprises information associated with a first temperature and the fluid spectroscopy information comprises information associated with the first temperature.

In one or more aspects of the disclosed method, the sensor spectra information comprises spectra information associated with a second temperature, and the method further comprises determining sensor spectra information associated with the first temperature using interpolation.

In one or more aspects of the disclosed method, the sensor response information comprises information associated with a first plurality of pressures and the fluid spectroscopy information comprises information associated with the first plurality of pressures.

In one or more aspects of the disclosed method, the method further comprises normalizing the sensor response information using neutral density normalization.

In another embodiment, a computer-readable medium comprises instructions that are operable, when executed by a processor, to cause the processor to receive sensor response information associated with an optical sensor of a downhole drilling tool and a first fluid, receive sensor spectra information associated with the optical sensor, and receive fluid spectroscopy information associated with the first fluid. The instructions are also operable, when executed by the processor, to cause the processor to determine a transformation matrix using the sensor response information, the sensor spectra information, and the fluid spectroscopy information, and determine, using the transformation matrix, simulated sensor response information associated with the optical sensor and a second fluid.

In one or more aspects of the disclosed computer-readable medium, the instructions are further operable to cause a processor to determine simulated sensor response information associated with the second fluid using fluid spectroscopy information associated with the second fluid.

In one or more aspects of the disclosed computer-readable medium, the instructions are further operable to cause a processor to determine the transformation matrix using singular value decomposition.

In one or more aspects of the disclosed computer-readable medium, the sensor response information comprises information associated with a first temperature and the fluid spectroscopy information comprises information associated with the first temperature.

In one or more aspects of the disclosed computer-readable medium, the sensor spectra information comprises spectra information associated with a second temperature and the instructions are further operable to cause the processor to determine sensor spectra information associated with the first temperature using interpolation.

In one or more aspects of the disclosed computer-readable medium, the sensor response information comprises information associated with a first plurality of pressures and the fluid spectroscopy information comprises information associated with the first plurality of pressures.

In one or more aspects of the disclosed computer-readable medium, the instructions are further operable to cause the processor to normalize the sensor response information using neutral density normalization.

Illustrative embodiments of the present disclosure have been described herein. In the interest of clarity, not all features of an actual implementation may have been described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

It will be understood that the terms "couple" or "couples" as used herein are intended to mean either an indirect or a direct connection. Thus, if a first device couples to a second device, that connection may be through a direct connection, or through an indirect electrical or mechanical connection via other devices and connections. It will also be understood that the terms "drilling equipment" and "drilling system" are not intended to limit the use of the equipment and processes described with those terms to drilling an oil well. The terms will also be understood to encompass drilling natural gas wells or hydrocarbon wells in general. Further, such wells can be used for production, monitoring, or injection in relation to the recovery of hydrocarbons or other materials from the subsurface. This could also include geothermal wells intended to provide a source of heat energy instead of hydrocarbons.

For purposes of this disclosure, a control unit may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, a control unit may be a personal computer, a network storage device, or any other suitable device and may vary in size, shape, performance, functionality, and price. The control unit may include random access memory ("RAM"), one or more processing resources such as a central processing unit ("CPU") or hardware or software control logic, ROM, and/or other types of nonvolatile memory. Additional components of the control unit may include one or more disk drives, one or more network ports for communication with external devices as well as various input and output ("I/O") devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory ("EEPROM"), and/or flash memory; as well as communications media such as wires.

To facilitate a better understanding of the present disclosure, examples of certain embodiments have been given. In no way should the examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the wellbore below), or otherwise nonlinear wellbores in any type of subterranean formation. Certain embodiments may be applicable, for example, to logging data acquired with wireline, slickline, and logging while drilling/measurement while drilling (LWD/MWD). Certain embodiments may be applicable to subsea and/or deep sea wellbores. Embodiments described above with respect to one implementation are not intended to be limiting.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee.

What is claimed is:

1. A system, comprising:
a downhole tool;
an optical sensor coupled to the downhole tool; and
a sensor information mapping module operable to:
receive sensor response information associated with the optical sensor and a first fluid, wherein the first fluid is a reference fluid;
receive sensor spectra information from a database, wherein the sensor spectra information is based on a spectral analysis of the optical sensor, wherein the sensor spectra information comprises one or more of transmittance spectral curves, and wherein the sensor spectra information is convolved over one or more components of the optical sensor;
receive fluid spectroscopy information associated with the first fluid from the database, wherein the fluid spectroscopy information is selected from measured standard absorbance fluid spectrometry data that is converted to a transmittance spectroscopy data and normalized with neutral density filter responses as used in calculating a synthetic sensor response of the first fluid;
determine a transformation matrix using the sensor response information, pseudo inversion of the sensor spectra information, and pseudo inversion of the fluid spectroscopy information; and
determine, using the transformation matrix, simulated sensor response information associated with the optical sensor and a second fluid, wherein the second fluid is a selected fluid to be analyzed.

2. The system of claim 1, wherein the sensor information mapping module is further operable to determine simulated sensor response information associated with the second fluid using fluid spectroscopy information associated with the second fluid.

3. The system of claim 1, wherein the sensor information mapping module is further operable to determine the transformation matrix using singular value decomposition.

4. The system of claim 1, wherein:
the sensor response information comprises information associated with a first temperature; and
the fluid spectroscopy information comprises information associated with the first temperature.

5. The system of claim 1, wherein:
the sensor spectra information comprises spectra information associated with a second temperature; and
the sensor information mapping module is further operable to cause the processor to determine sensor spectra information associated with the first temperature using interpolation.

6. The system of claim 1, wherein:
the sensor response information comprises information associated with a first plurality of pressures; and
the fluid spectroscopy information comprises information associated with the first plurality of pressures.

7. The system of claim 1, wherein the sensor information mapping module is further operable to normalize the sensor response information using neutral density normalization.

8. A method, comprising:
receiving sensor response information associated with an optical sensor of a downhole drilling tool and a first fluid, wherein the first fluid is a reference fluid;
receiving sensor spectra information from a database, wherein the sensor spectra information is based on a spectral analysis of the optical sensor, wherein the sensor spectra information comprises one or more of transmittance spectral curves, and wherein the sensor spectra information is convolved over one or more components of the optical sensor;
receiving fluid spectroscopy information associated with the first fluid from the database, wherein the fluid spectroscopy information is selected from measured standard absorbance fluid spectrometry data that is converted to a transmittance spectroscopy data and normalized with neutral density filter responses as used in calculating a synthetic sensor response of the first fluid;
determining a transformation matrix using the sensor response information, pseudo inversion of the sensor spectra information, and pseudo inversion of the fluid spectroscopy information; and
determining, using the transformation matrix, simulated sensor response information associated with the optical sensor and a second fluid, wherein the second fluid is a selected fluid to be analyzed.

9. The method of claim 8, further comprising determining simulated sensor response information associated with the second fluid using fluid spectroscopy information associated with the second fluid.

10. The method of claim 8, further comprising determining the transformation matrix using singular value decomposition.

11. The method of claim 8, wherein:
the sensor response information comprises information associated with a first temperature; and
the fluid spectroscopy information comprises information associated with the first temperature.

12. The method of claim 8:
wherein the sensor spectra information comprises spectra information associated with a second temperature; and
further comprising determining sensor spectra information associated with the first temperature using interpolation.

13. The method of claim 8, wherein:
the sensor response information comprises information associated with a first plurality of pressures; and
the fluid spectroscopy information comprises information associated with the first plurality of pressures.

14. The method of claim 8, further comprising normalizing the sensor response information using neutral density normalization.

15. A non-transitory computer-readable medium comprising instructions that are operable, when executed by a processor, to cause the processor to:
receive sensor response information associated with an optical sensor of a downhole drilling tool and a first fluid, wherein the first fluid is a reference fluid;
receive sensor spectra information from a database, wherein the sensor spectra information is based on a spectral analysis of the optical sensor, wherein the sensor spectra information comprises one or more of transmittance spectral curves, and wherein the sensor spectra information is convolved over one or more components of the optical sensor;
receive fluid spectroscopy information associated with the first fluid from the database, wherein the fluid spectroscopy information is selected from measured standard absorbance fluid spectrometry data that is converted to a transmittance spectroscopy data and normalized with neutral density filter responses as used in calculating a synthetic sensor response of the first fluid;

determine a transformation matrix using the sensor response information, pseudo inversion of the sensor spectra information, and pseudo inversion of the fluid spectroscopy information; and determine, using the transformation matrix, simulated sensor response information associated with the optical sensor and a second fluid, wherein the second fluid is a selected fluid to be analyzed.

16. The non-transitory computer-readable medium of claim 15, wherein the instructions are further operable to cause a processor to determine simulated sensor response information associated with the second fluid using fluid spectroscopy information associated with the second fluid.

17. The non-transitory computer-readable medium of claim 15, wherein the instructions are further operable to cause a processor to determine the transformation matrix using singular value decomposition.

18. The non-transitory computer-readable medium of claim 15, wherein:

the sensor response information comprises information associated with a first temperature; and the fluid spectroscopy information comprises information associated with the first temperature.

19. The non-transitory computer-readable medium of claim 15, wherein:

the sensor spectra information comprises spectra information associated with a second temperature; and the instructions are further configured to cause the processor to determine sensor spectra information associated with the first temperature using interpolation.

20. The non-transitory computer-readable medium of claim 15, wherein:

the sensor response information comprises information associated with a first plurality of pressures; and the fluid spectroscopy information comprises information associated with the first plurality of pressures.

21. The non-transitory computer-readable medium of claim 15, the instructions are further configured to cause the processor to normalize the sensor response information using neutral density normalization.

* * * * *